(12) United States Patent
Furuhaug (10) Patent No.: US 8,499,638 B2
(45) Date of Patent: Aug. 6, 2013

(54) FIBRE OPTIC ACCELEROMETER AND A METHOD OF MANUFACTURING A FIBRE OPTIC ACCELEROMETER

(75) Inventor: Roar Furuhaug, Trondheim (NO)

(73) Assignee: Optoplan AS, Tiller (NO)

( * ) Notice: Subject to any disclaimer, the term of this patent is extended or adjusted under 35 U.S.C. 154(b) by 322 days.

(21) Appl. No.: 13/038,004

(22) Filed: Mar. 1, 2011

(65) Prior Publication Data

US 2011/0219874 A1 Sep. 15, 2011

(30) Foreign Application Priority Data

Mar. 12, 2010 (EP) .................................. 10156380

(51) Int. Cl.
*G01P 15/08* (2006.01)
*G01H 9/00* (2006.01)

(52) U.S. Cl.
USPC ........................ 73/653; 73/514.26; 250/227.14

(58) Field of Classification Search
USPC ............. 73/514.26, 514.27, 653; 250/227.14; 356/477, 478; 367/149
See application file for complete search history.

(56) References Cited

U.S. PATENT DOCUMENTS

| 6,891,621 | B2 | 5/2005 | Berg et al. | |
| 7,243,543 | B2 * | 7/2007 | Berg et al. | 73/514.26 |
| 7,551,517 | B2 | 6/2009 | Berg et al. | |

FOREIGN PATENT DOCUMENTS

| GB | 2419410 A | 4/2006 |
| GB | 2422661 A | 8/2006 |
| GB | 2455930 A | 7/2009 |
| GB | 2455931 A | 7/2009 |
| WO | 2007042761 A1 | 4/2007 |

OTHER PUBLICATIONS

J.M. De Freitas, et al. "Measurement of Sensor Axis Misalignment in Fibre-Optic Accelerometers," Institute of Physics Publishing. Measurement and Science Technology, vol. 17 (2006) pp. 1819-1825.
Hilde Nakstad, et al. "Realisation of Full-scale Fibre Optic Ocean Bottom Seismic System," SPIE Digital Library, vol. 7004, May 16, 2008, (4 pages).
European Search Report for Application No. EP10156380, dated Aug. 3, 2010.

* cited by examiner

*Primary Examiner* — John Chapman, Jr.
(74) *Attorney, Agent, or Firm* — Pearl Cohen Zedek Latzer, LLP (57) ABSTRACT

A tri-axis accelerometer for use in seismic surveying is provided. The accelerometer comprises at least three fiber optic accelerometer elements which have respective fiber sensor coils, and which are characteristic in that the fiber sensor coils are coiled about a common coiling axis and at least one of the accelerometer elements is a slant angle accelerometer element. A corresponding method of manufacturing a tri-axis fiber optic accelerometer is also disclosed. A fiber optic tri-axis accelerometer for sensing acceleration in three directions is also provided, which comprises a first, a second, and a third sensor base, each base including a first, a second, and a third fixed element, respectively, and a first, a second, and a third movable element, respectively, each pair of fixed and movable elements carrying a fiber sensing coil. The fiber sensing coils are all coiled around a common coiling axis and at least one of the movable elements is designed and mounted so as to be movable in a direction that is slanted with respect to the common coiling axis.

18 Claims, 7 Drawing Sheets

FIBRE OPTIC ACCELEROMETER AND A METHOD OF MANUFACTURING A FIBRE OPTIC ACCELEROMETER

CROSS-REFERENCE TO RELATED APPLICATIONS

This application claims priority to EP Application No. 10156380.7, filed Mar. 12, 2010, which is herein incorporated by reference in its entirety.

FIELD OF THE INVENTION

Embodiments of the present invention generally relate to a fibre optic tri-axis accelerometer for sensing acceleration, and in particular to the application of such a fibre optic accelerometer in seismic cables for sensing seismic signals, and to methods of fabricating a seismic cable including such a fibre optic accelerometer. Even more particularly, embodiments of the present invention relate to fibre optic accelerometers for sensing acceleration in three dimensions and to fibre optic accelerometers for integration into seismic cables to be towed behind a vessel as part of seismic surveying activities or for being placed semi-permanently on the ocean bottom for monitoring subsurface structures, such as for example hydrocarbon resources during the production phase as is known in the oil and gas industry. Embodiments of the invention also relate to a method of fabricating a seismic sensor cable to be used in seismic surveying activities, for example using towed streamer cables or ocean bottom seismic sensor systems permanently arranged on the seafloor.

BACKGROUND OF THE INVENTION

It is well known to use fibre optic sensor for the measurement of acceleration of certain structures. Such fibre optic sensors may for example be configured as fibre optic interferometers.

In recent years there has been a growing interest in using optical fibre sensing techniques in marine seismic exploration surveys for the exploration and monitoring of hydrocarbon producing zones and reservoirs.

For these purposes it is common to use seismic cables towed behind a vessel or deployed on the ocean floor. Such cables typically include an array of accelerometers capable of detecting acceleration produced by acoustic waves being reflected from regions below the ocean floor.

As an example United Kingdom patent publication GB 2,455,930 describe a method of fabricating a fibre optic accelerometer in which a movable mass, a fixed element and a movable element that moves with the mass is first provided, after which an optical waveguide is wrapped as a sensing coil to complete the accelerometer.

United Kingdom patent publications GB 2,455,931 and GB 2,422,661 describe examples of cross-line accelerometers and in-line accelerometers, respectively, which may be produced according to the method described in GB 2,445,930. The accelerometers are intended for being coupled to any surface or structure subjected to acceleration to be sensed, and in particular for being disposed within sensor stations spaced along a seismic cable used to obtain an ocean bottom seismic (OBS) survey.

Another example in the prior art is U.S. Pat. No. 6,891,621 which describes a fibre optic based cross-axis accelerometer for determining the acceleration of a structure. It is described how optical fibre coils could be employed as support members for a rotationally supported housing including a mass. The optical fibre could be used as a part of an optical fibre interferometer.

In seismic sensors it is normally required to arrange a large number of sensors, such as accelerometers. GB 2,455,930 describes an effective method of manufacturing fibre optic accelerometers. Because that solution enables assembly of all of the main components of the accelerometer before the fibre is coiled onto the assembly the handling of the optical fibre is reduced and a reliable manufacturing process is enabled.

In the field of fibre optic sensing it is now common practice to package a plurality of fibre optic sensor elements together, for example as exemplified by the seismic station package of U.S. Pat. No. 7,551,517 in which three fibre optic accelerometers and one hydrophone are packaged into a seismic station.

International patent application publication WO 2007/042761 discloses a fibre-optic package which typically comprises two or more fibre optic accelerometers coupled together by fused-fibre coupling. A method of fabricating a fibre-optic package is also disclosed in which a step in the method is to form first, second and third individual fibre-optic accelerometers from a single optical fibre without the need for fibre-fusion splices between the sensors. In this method the individual fibre coils are mounted into the package after coiling.

With respect to manufacturing processes, the solution of WO 2007/042761 describes the coiling of the fibre coils prior to assembling of the package, inherently necessitating handling and mounting of the accelerometers with fibre coils and/or the cutting and splicing of the fibre of each fibre coil of the package.

Unpublished European Patent Application No. 09172431.0 to this applicant describes the manufacturing of fibre optic sensors in general and in particular the manufacturing of seismic sensors for use in seismic surveying activities in subsea environments in which a continuous optical fibre is coiled onto two or more sensor elements so as to form multiple sensor units. The sensor elements are arranged as part of a stack in a coiling jig. The sensor elements are disassembled from the stack prior to being mounted in a sensor package, as shown on FIG. 5 of that application.

Due to the large number of sensors in seismic cables it is desirable to minimize the handling of each sensor and to be able to perform the manufacturing process in as few steps as possible. In fibre optic based seismic cables a simplification of the process of assembling the optical fibre based accelerometers and a reduction of the handling of the optical fibre is particularly desirable. Seismic cable design and optical fibre accelerometer designs that could help to meet such objectives would be particularly preferable.

OBJECT OF THE INVENTION

It is thus an object of the present invention to provide an alternative fibre optic accelerometer design for sensing acceleration and which can be efficiently and reliably produced and incorporated in a seismic cable.

It is a further object of the present invention to provide a tri-axis accelerometer including fibre optic accelerometer elements that can be efficiently and conveniently produced by reducing the handling of the optical fibre of the accelerometers during the manufacturing process.

It is yet an object of the present invention to provide a method of reliable and efficient manufacturing of tri-axis accelerometers capable of sensing acceleration in several directions, preferably in the three directions of space and that may be used in seismic cables or seismic streamer systems.

SUMMARY OF THE INVENTION

The above described object and several other objects are intended to be obtained in a first aspect of the invention by providing a tri-axis accelerometer for use in seismic surveying. The tri-axis accelerometer comprises at least three fibre optic accelerometer elements wherein the at least three accelerometer elements have fibre sensor coils the sensor coils being coiled about a common coiling axis, and wherein at least one accelerometer element is a slant angle accelerometer.

An accelerometer element is in the context of the present invention intended to be an element capable of sensing acceleration in one direction, whereas a tri-axis accelerometer is defined as a combination of three accelerometer elements where the accelerometer elements are capable of sensing acceleration in three different directions.

A slanted accelerometer element is in the context of the present invention defined as an accelerometer in which a counter mass is arranged to be movable in a sensing direction having an angle $\theta$ defined by $0<\theta<\pi/2$ with respect to a common coiling axis. This makes it possible to also measure a component of acceleration in the longitudinal direction of a seismic cable.

Embodiments of the tri-axis accelerometer according to the invention comprises a first, a second and a third sensor base, the bases includes a first, a second and a third fixed element, respectively, and a first, a second and a third movable element, respectively. The three movable elements are arranged to be movable in parallel with corresponding first, second and third axes, respectively. The three axes may form an orthogonal set of axes. The orthogonal axes may be oriented so that they have the same angle with respect to a common coiling axis.

In some embodiments of the tri-axis accelerometer according to the invention a first, a second, and a third sensor base are provided. The bases includes corresponding first, second and third fixed elements, respectively, and corresponding first, second and third movable element, respectively. The three movable elements may be arranged to be movable in parallel with corresponding first, second and third axes, respectively. In some embodiments of the tri-axis accelerometer the three axes form an orthogonal set of axes, and the orthogonal set of axes may be oriented so that they have the same angle with respect to a common coiling axis. In yet further embodiments of the tri-axis accelerometer according to the invention the same angle referred to above is defined by $\theta=\mathrm{acos}\sqrt{(1/3)}$. The three axes forming an orthogonal set of axes may in some embodiments be symmetrically arranged with respect to a common coiling axis.

In some embodiments of the tri-axis accelerometer according to the invention the common coiling axis of the fibre coils of the accelerometers are aligned with a longitudinal axis of the cable.

In further embodiments of the tri-axis accelerometer according to the invention each sensor base include a fibre coil carrying surface carrying a fibre coil of an optical fibre, and where the coil carrying surface for each coil define a plane of the fibre coil to be transversally to a longitudinal axis of an elongate element. The three sensor bases with movable cylinder elements may be similar in size and form.

In still further embodiments of the tri-axis accelerometer according to the invention the three sensor bases with movable elements may be arranged at different longitudinal positions along the tri-axis accelerometer and in different rotational orientations with respect to a common coiling axis. Each movable element may be movably coupled to a fixed part of a body of the seismic cable via a spring device, for example a helically coiled spring or a membrane structure. The spring element may comprise a combination of the fibre coil of the same accelerometer element and a spring element, such as a spring or a membrane structure which suspends the movable element. The spring element may optionally also be designed so as to provide a directional guiding for the movement of the movable element.

The movable element may be arranged so as to cause a force to be exerted on the fibre coils so as to deform the respective fibre coil in the coiling plane when subjected to acceleration.

The tri-axis accelerometer according to the invention may comprise optical fibre Bragg gratings (FBGs), for example as a part of the fibre optical coils of the accelerometer elements, or at other locations along the optical fibre(s) of the seismic cable.

In another aspect of the invention there is provided a method of manufacturing a tri-axis accelerometer, the method comprising arranging three accelerometer elements so that the fibre sensor coils are all coiled around a common coiling axis, and wherein the step of arranging the three accelerometer elements comprise arranging at least one accelerometer element with its movable element to be movable at a slant angle with respect to the plane of the fibre coil of the at least one accelerometer element.

The manufacturing method according to the invention may comprise the step of arranging corresponding first, second and third sets of fixed elements of the first, a second and a third sensor bases, respectively and corresponding first, second and third movable elements of the first, a second and a third sensor bases, respectively, so that the movable elements are movable in parallel with a first, a second and a third axis, respectively.

In further embodiments of the manufacturing method according to the invention the three axes may be oriented at the same angle with respect to a common coiling axis in a manner so that each one of the three axes are orthogonal to the two other axes.

In yet further embodiments of the manufacturing method according to the invention an optical fibre may be coiled onto respective fibre carrying surfaces of the three sensor bases in a continuous operation thereby forming three fibre coils in a continuous section of fibre, each fibre coil being arranged on respective sensor bases. All three fibre coils may be coiled in a single process step.

In yet further embodiments of the manufacturing method according to the invention movable elements may be mounted at least partially within corresponding bores in a body of the seismic cable. Each movable element may be attached to a spring element, for example a membrane structure, the spring element being coupled to a body of the seismic cable. The plane of the fibre coils may be oriented transversally to the common coiling axis.

In the manufacturing method according to the invention a fibre coil of a fibre optic hydrophone may also be coiled around the coiling axis (C).

In embodiments of the manufacturing method according to the second aspect of the invention the accelerometer elements are placed in their final position in the tri-axis accelerometer before the fibre coiling operation, so that no reorganization of the accelerometer elements is required after the coiling operation.

In a third aspect of the invention there is provided a tri-axis fibre optic accelerometer for sensing acceleration in three directions comprising a first, a second and a third sensor base, each base including a first, a second and a third fixed element, respectively, and a first, a second and a third movable element, respectively. Each pair of a fixed and a respective movable element carries a fibre sensing coil. The fibre optic tri-axis accelerometer is characteristic in that the fibre sensing coils are all coiled around a common coiling axis; and that at least one of the movable elements are designed and mounted so as to be movable in directions that is slanted with respect to the coiling plane of respective sensing coil.

The first, the second and the third movable elements may in some embodiments of the tri-axis accelerometer according to the invention be movable in a first, a second, and a third direction, respectively, the first, second and third directions spanning a three-dimensional space.

The three movable elements may be arranged to be movable in parallel with a first, a second and a third axis, respectively, which together form an orthogonal set of axes. The tri-axis accelerometer according to the third aspect of the invention is characteristic in that the set of axes define the directions of movement of the three movable elements. The direction of movement for each movable element may be slanted with respect to the coiling planes of respective three fibre sensing coils.

In some embodiments of the tri-axis accelerometer according to the third aspect of the invention the directions of movement of the three movable elements may have the same angle with respect to a common coiling axis.

Further embodiments of the tri-axis accelerometer according to the third aspect of the invention comprises a first, a second and a third fibre sensing coil arranged on respective combinations of first fixed and movable elements, second fixed and movable elements, and third fixed and movable elements, respectively. The three fibre coils are oriented in respective planes that are transversal to a common coiling axis.

In yet further embodiments of the tri-axis accelerometer according to the third aspect of the invention the three fibre coils may have elongated shapes, each elongate shape being rotated at 120 degrees with respect to the coiling axis of the fibre coils. This has the advantage that the three fibre coils may be identical or almost identical in form.

The tri-axis accelerometer may in some embodiments be designed so that the three fibre coils of the accelerometer are part of an elongate structure arranged so that a longitudinal axis of the elongate structure is parallel with a longitudinal axis of a seismic cable. The longitudinal axis of the elongate structure may coincide with the longitudinal axis of the seismic cable.

A major benefit of the tri-axis fibre optic accelerometers according to the first and third aspect of the invention is that the three coils of the tri-axes accelerometer may be coiled in a continuous coiling operation. This is possible because all of the fibre coils of the three accelerometer elements making up the tri-axis accelerometer are coiled around a common coiling axis, and the coiling process is thus greatly simplified and provides for an efficient and reliable coiling process. A single length of fibre can thus be used to coil all of the three accelerometers of a tri-axis accelerometer, while varying the pitch of the coiling depending on position along the coiling axis, to create a large number of fibre turns per length at the sensor coil of the accelerometer and a smaller number of turns of optical fibre between each accelerometer element.

Another major benefit of the present invention is that it simplifies the production of accelerometers with optical fibre sensing coils, for example in a seismic cable. Even for seismic cables with accelerometers for acceleration sensing in three dimensions all the fibre coils may be coiled about a common coiling axis, thereby allowing an efficient and convenient production of a seismic cable.

The present invention allows for all fibre coils of the optical fibre sensors and also of the reference elements of the seismic cable to have their fibre coils in the same orientation thus avoiding the reorganization of the sensor coils after completing the sensors in the coiling operation, as is required with the solutions described in U.S. Pat. No. 7,551,517 or in unpublished European Patent Application No. 09172431.0.

With the present invention a manufacturing method is provided which is well suited for automatic production lines. This means that a long seismic cable with many sensors may be efficiently produced without excessive fibre handling operations. Manual handling of the fibre may be altogether eliminated, removing the human handling source of error in the handling of the sensors.

BRIEF DESCRIPTION OF THE DRAWINGS

The fibre optic tri-axis accelerometer according to the invention and the associated method of manufacturing the fibre optic accelerometer, with particular emphasis on the application to the manufacturing of seismic cables will now be described in more detail with reference to the accompanying figures, in which.

The figures show example embodiments of the present invention and are not to be construed as being limiting to other possible embodiments falling within the scope of the attached claim set.

DETAILED DESCRIPTION

Figure 1:
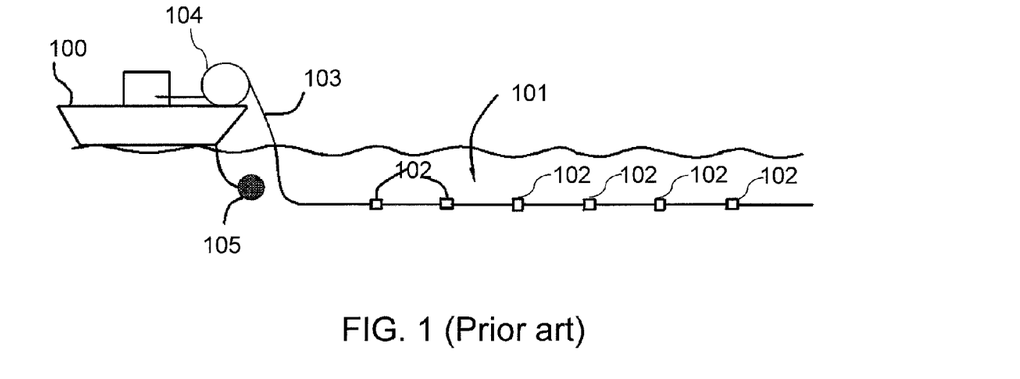
FIG. 1 illustrates a typical prior art application in which a seismic cable including sensor stations is towed behind a vessel.

FIG. 1 illustrates a typical application of the present invention with reference to prior art. In FIG. 1 there is shown a seismic cable 101 with several sensor stations 102 spaced along the cable 101. In a marine seismic surveying operation a vessel 100 deploys the cable 101 from a drum 104. A lead-in cable section 103 may be included between the seismic cable 101 and the vessel 100. An acoustic source 105 submersed in water may be connected to the vessel 100 for controllably producing controlled acoustic waves which are propagated down into the subterranean environment. Reflections of the acoustic waves from the subterranean environment propagate back up towards the surface of the water and are picked up by the sensor stations 102 where sensors are capable of sensing the reflected acoustic waves. Such sensor stations typically include several accelerometer elements and possibly a hydrophone. The processing of the detected acoustic signal reflections as provided by the sensor stations is made to characterize the subterranean region to identify the presence of for example, reservoirs of hydrocarbon content such as oil and/or gas.

The present inventors have realized that it is possible to provide a fibre optic based three-dimensional acceleration sensor which may be efficiently produced and that may also be efficiently provided in a seismic cable in a production friendly manner. A core idea of the invention is to utilize a slanted design of accelerometer elements, as will be defined and described in more detail in the following.

Figure 2:
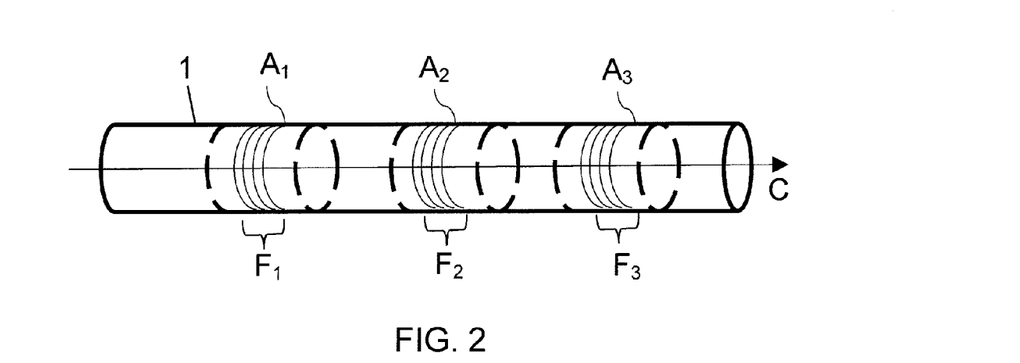
FIG. 2 illustrates three accelerometer elements of a tri-axis accelerometer according to the invention in which at least one of the accelerometer elements is a slanted accelerometer.

FIG. 2 illustrates how three accelerometer elements, $A_1$, $A_2$, and $A_3$, which are mounted along an elongate support structure 1, and which together make up a tri-axis accelerometer, may have optical fibre sensing coils $F_1$, $F_2$, and $F_3$ that are coiled about a common coiling axis C. The elongate structure 1 could for example be a block of generally cylindrical outline that is mounted along a seismic cable 101, for example using a technique similar to the one described in U.S. Pat. No. 7,660,206 which among other aspects describes how a seismic cable is terminated for integrating a sensor station along an ocean bottom seismic station. In other embodiments the block 1 could be a section of an elongated element that is integrated into a larger elongate structure, for example a seismic cable.

The common coiling axis C may, in the case that the tri-axis accelerometer of the invention is integrated as part of a seismic cable 101, be parallel to or even coincide with a longitudinal axis of the seismic cable 101. The first accelerometer element $A_1$ and/or the second accelerometer element $A_2$ may be realized as so called in-line accelerometer elements in which a coil of optical fibre is arranged around and coupled to a movable mass or element (also called a counter mass) which is mounted so as to move in the plane of the fibre coil and exert a varying pressure on the fibre coil when the seismic cable is subjected to an acceleration in a transversal direction. By arranging the first accelerometer element $A_1$ and/or the second accelerometer element $A_2$ at different orientations in a transversal plane with respect to a longitudinal axis of the seismic cable it is possible to sense accelerations in all directions in the transversal plane of a common coiling axis C. Accelerometer elements which are sensitive to acceleration in a direction in line with the plane of the optical fibre coil are referred to as in-line accelerometer elements. Such in-line accelerometer elements will normally not be sensitive to acceleration along the common coiling axis C of the fibre coils. When the tri-axis accelerometer is integrated into a seismic cable, the common coiling axis C may coincide with the longitudinal axis of the seismic cable, however, the common coiling axis C may also be translated or arranged at an angle with respect to the longitudinal direction of the seismic cable. To enable also measurement of acceleration in the longitudinal direction of the seismic cable at least one of the three accelerometer elements $A_{1-3}$, for example a third accelerometer element $A_3$ is designed as a slant angle accelerometer element, so that the collection of the three accelerometer elements $A_{1-3}$, form a tri-axis accelerometer which is sensitive to components of the acceleration along the longitudinal direction of the seismic cable or the common coiling axis C.

By incorporating at least one slant angle accelerometer element in a support structure 1 including a set of three accelerometer elements it will be possible not only to measure transversal acceleration components in the seismic cable 101 but also longitudinal acceleration components.

Figure 3:
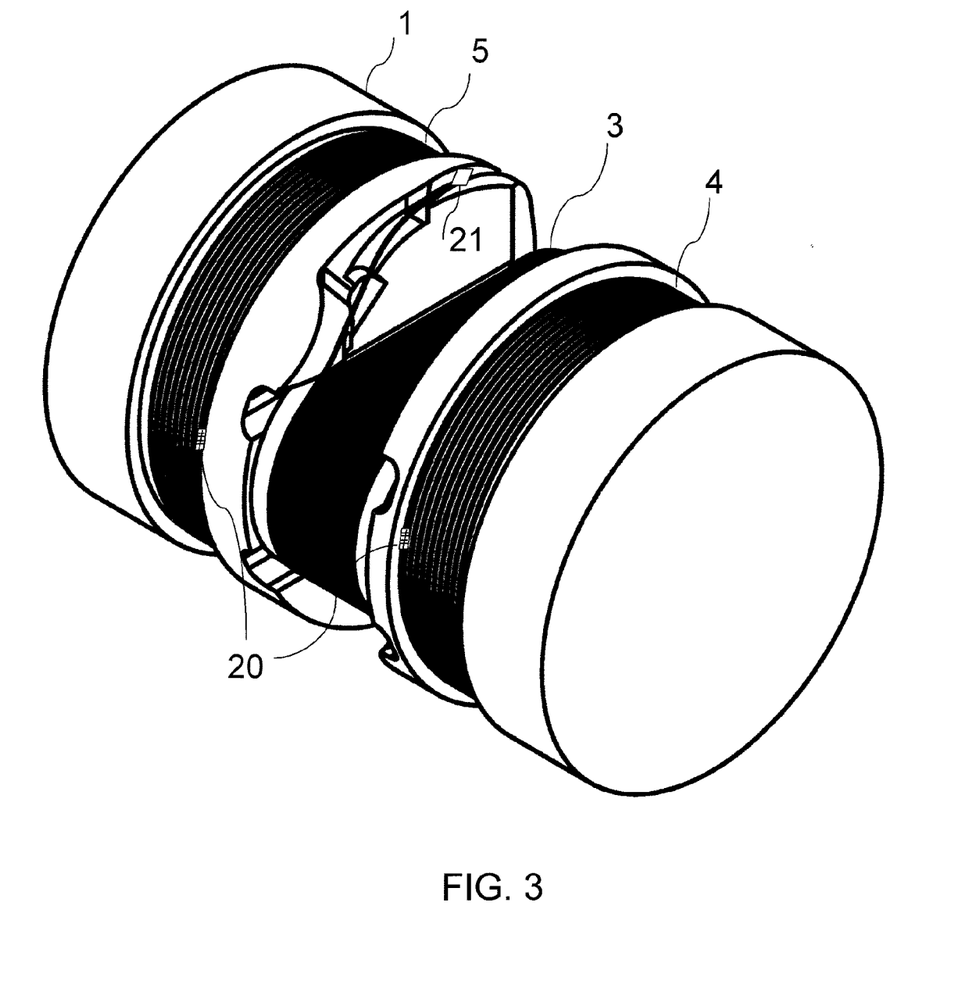
FIG. 3 shows a perspective view of a fibre optic accelerometer element of a tri-axis accelerometer according to the invention showing how the optical fibre sensing coil may be arranged.

FIG. 3 is a perspective view of any of the three accelerometer elements $A_{1-3}$ showing the arrangement of an accelerometer fibre coil 3 in any of the optical fibre accelerometer elements $A_{1-3}$ of tri-axis accelerometer according to the invention. Two reference elements, such as for example optical fibre Bragg gratings 20 are prepared in the optical fibre, one on each side of the accelerometer coil 3, whereby the section of optical fibre between the two fibre Bragg gratings (FBGs) 20 can be defined as the active sensor fibre, in other words it will be the optical length of optical fibre between the FBGs that may be monitored by interrogating instrumentation connected to the optical fibre. The interrogation instrumentation is not shown and not a part of this invention but will typically be adapted to transmit optical signals into the optical fibre and to detect optical signals reflected from the FBGs, as will be known to a person skilled in the art of optical fibre sensor technique. The reference elements 20 may be realized as any known integrated optical coupler or mirror or reflector that could be monitored by an interrogation instrumentation otherwise known to a person skilled in the art.

The fibre coil 3 of any of the accelerometer elements $A_{1-3}$, which is also referred to as an accelerometer coil, is coiled about a coiling axis C. The coiling axis C may thus be defined as an axis which is perpendicular to the plane of the optical fibre coil 3. As will be understood by a person reading this disclosure it will be beneficial to have a common coiling axis C for all of the fibre coils 3 in a tri-axis fibre optic accelerometer, as this will simplify the manufacturing steps of the tri-axis accelerometer in that all accelerometer fibre coils may be coiled in one operation.

In many embodiments of the invention the fibre coils $F_{1-3}$ may have a coiling plane which is transversal to the longitudinal axis of tri-axis accelerometer, whereby the common coiling axis C will be parallel with the longitudinal axis of the tri-axis accelerometer, however, the common coiling axis C may also deviate from the longitudinal axis of the tri-axis accelerometer, for example in a seismic cable application. In principle, a tri-axis accelerometer according to the present invention could be arranged with its coiling axis C in a number of different directions in a seismic cable 101, provided the common coiling axis C is common to all of the fibre coils $F_{1-3}$.

In FIG. 3 it is illustrated how optical fibre intermediate coils 4, 5 are arranged on each side of the accelerometer coil 3 as continuations of the same optical fibre which forms the accelerometer coil 3. An intermediate coil 4 or 5 may operate as a reference unit as is described in unpublished European Patent Application No. 09172431.0, provided the intermediate coil is coiled onto a non-compliant core structure or mandrel, or alternatively the intermediate coil 4 or might operate as another sensor element such as a hydrophone provided the fibre of the intermediate coil is coiled onto a compliant core structure or mandrel. In both these cases further FBGs will be required to enable interrogation of the reference unit or the additional sensor.

In the sections of optical fibre on each side of the accelerometer coil 3 there may be provided optical fibre Bragg gratings (FBGs) with characteristic optical wavelength transmission and reflection properties which makes it possible to sense and measure changes in the optical length of the accelerometer coil 3 from an end of the optical fibre by utilizing any one of the interrogation techniques which are known to a person skilled in the art of optical fibre sensing techniques, for example the techniques described in U.S. Pat. No. 7,366,055 or related patents.

Referring now to FIGS. 4A-B and FIGS. 5A-C the design and operation of the in-line and slanted accelerometer elements will be described in more detail so that a better understanding of the idea behind the use of the slant angle accelerometer element and how this may be useful in practical applications may be obtained. In each of the accelerometer elements $A_{1-3}$ a movable element 6, 8 incorporates a counter mass 6. The counter mass 6 is mounted within a corresponding bore 7 provided in a support structure 1, possibly being a part of the seismic cable. The counter mass 6 has a cross sectional profile similar to the inside of the bore so that it can move within the bore 7 in its longitudinal direction A, only retained by the spring action of a combination of the spring element $11_{A,B}$ and the fibre coil 3. A stop element 12 may be mounted between the counter mass 6 and the movable element 8, so as to prevent excess movement of the counter mass 6 against the fibre coil 3.

When the seismic cable is subjected to acceleration in the direction A the movable element 6, 8 is caused to move in the direction A in which it is free to move, retained only by the spring action of the combined operation of the spring element 11 and the fibre coil 3. The spring element $11_{A,B}$ is preferably designed, by suitable dimensioning, such that in this combined operation the spring action of the spring element $11_{A,B}$ will typically be the dominating element for controlling the movement of the movable element $11_{A,B}$. This dimensioning ensures that the fibre coil 3 will not be subject to excessive strains and possible breakage.

In the case when the angle 8 between the direction of movement of the movable element 6, 8 and the coiling axis C is equal to π/2 radians the accelerometer element will be an in-line accelerometer element as the direction of movement of the movable element will be in the plane of the fibre coil. In the case when the angle θ is in the range between 0 and π/2 radians, the accelerometer element will in the context of this invention be defined as a slant angle accelerometer element.

It will be seen that in the present invention a fibre coil of an accelerometer element will be insensitive to acceleration along the coiling axis C if θ=π/2. Sensitivity to acceleration along the coiling axis C, which may coincide with the longitudinal axis of a seismic cable, may be obtained with θ≠π/2. This means that the accelerometer element is designed to have the direction of movement of the counter mass in a direction which is outside the plane of the fibre coil, thus creating a slanted accelerometer element.

A slanted accelerometer element may in the present invention be defined as an accelerometer element in which a movable element 6, 8 is arranged to be movable in a sensing direction A at an angle θ defined by 0<θ<π/2 with respect to the common coiling axis C. In a seismic cable application of the slant angle accelerometer element the counter mass 6 will try to maintain its relative position in space when the seismic cable 101 is accelerated, thus creating a force on a spring element 7 and on the fibre coil 3 in the direction A, thereby making the fibre coil sensitive to acceleration components along the coiling axis C. As will be understood from FIGS. 4A-B and FIGS. 5A-B, the counter mass 6 exerts a force on the fibre coil 3 via a movable part 8. The accelerometer coil may be coiled onto a fixed part 9 and a movable part 8. The movable part 8 may be designed to have a semi-cylinder shaped surface onto which the fibre may be conveniently coiled. Similarly, the fixed part 9 may also be shaped as a semi-cylinder which is fixedly attached to a body of the tri-axis accelerometer or of the seismic cable 101 or alternatively it may be a surface machined from a body 1 of the tri-axis accelerometer or of the seismic cable 101.

Figure 4A:
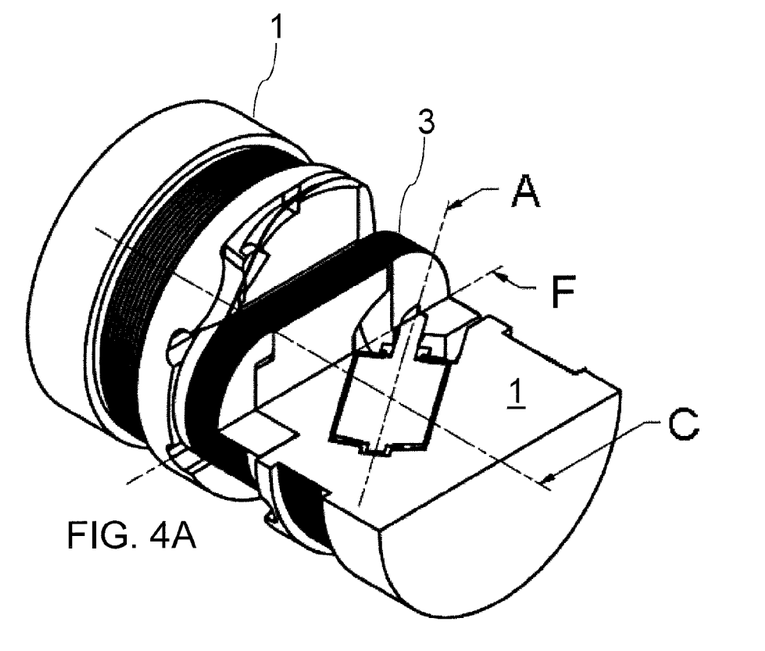
FIGS. 4A-B show a partial cut-away section of a slanted accelerometer element of the tri-axis accelerometer according to the invention with the directions of the fibre coil, the sensing direction, and the common coiling axis indicated.
Figure 4B:
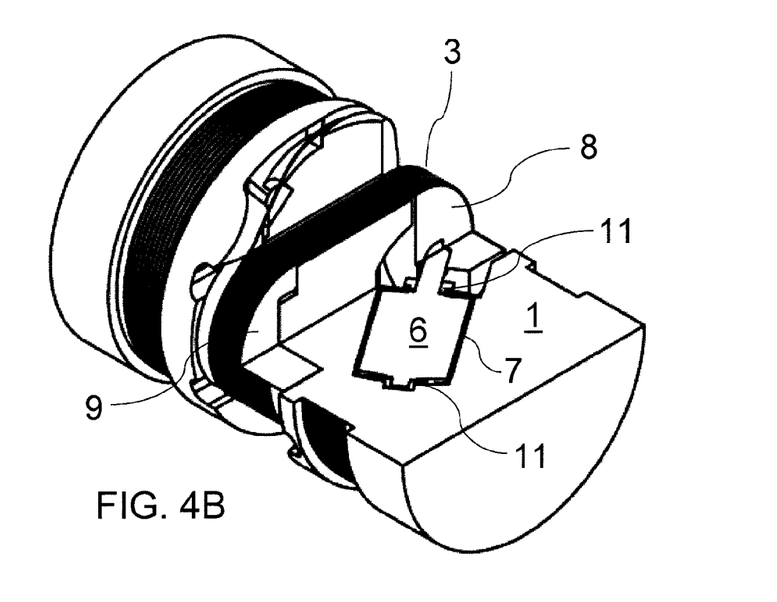
Figure 5A:
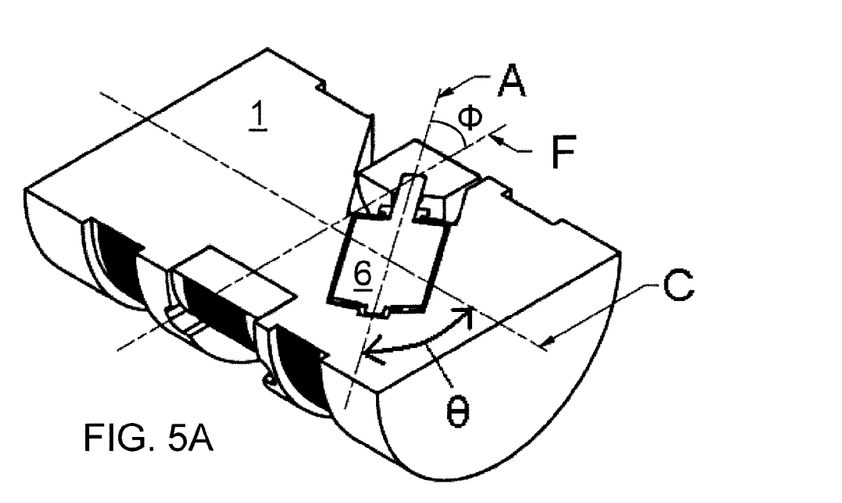
FIGS. 5A-B show a cross section of a slanted accelerometer element of the tri-axis fibre optic accelerometer according to the invention with an indication of the angle between the direction of movement of the counter mass of the slanted accelerometer element and the common coiling axis.
Figure 5B:
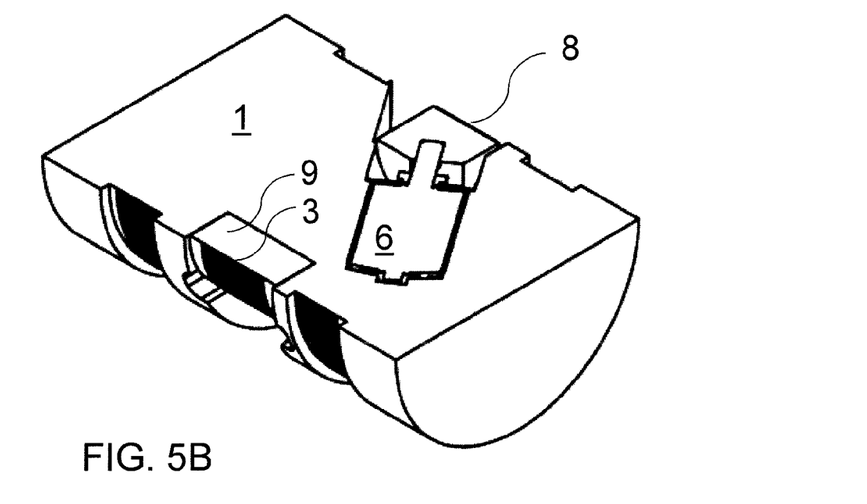
Figure 5C:
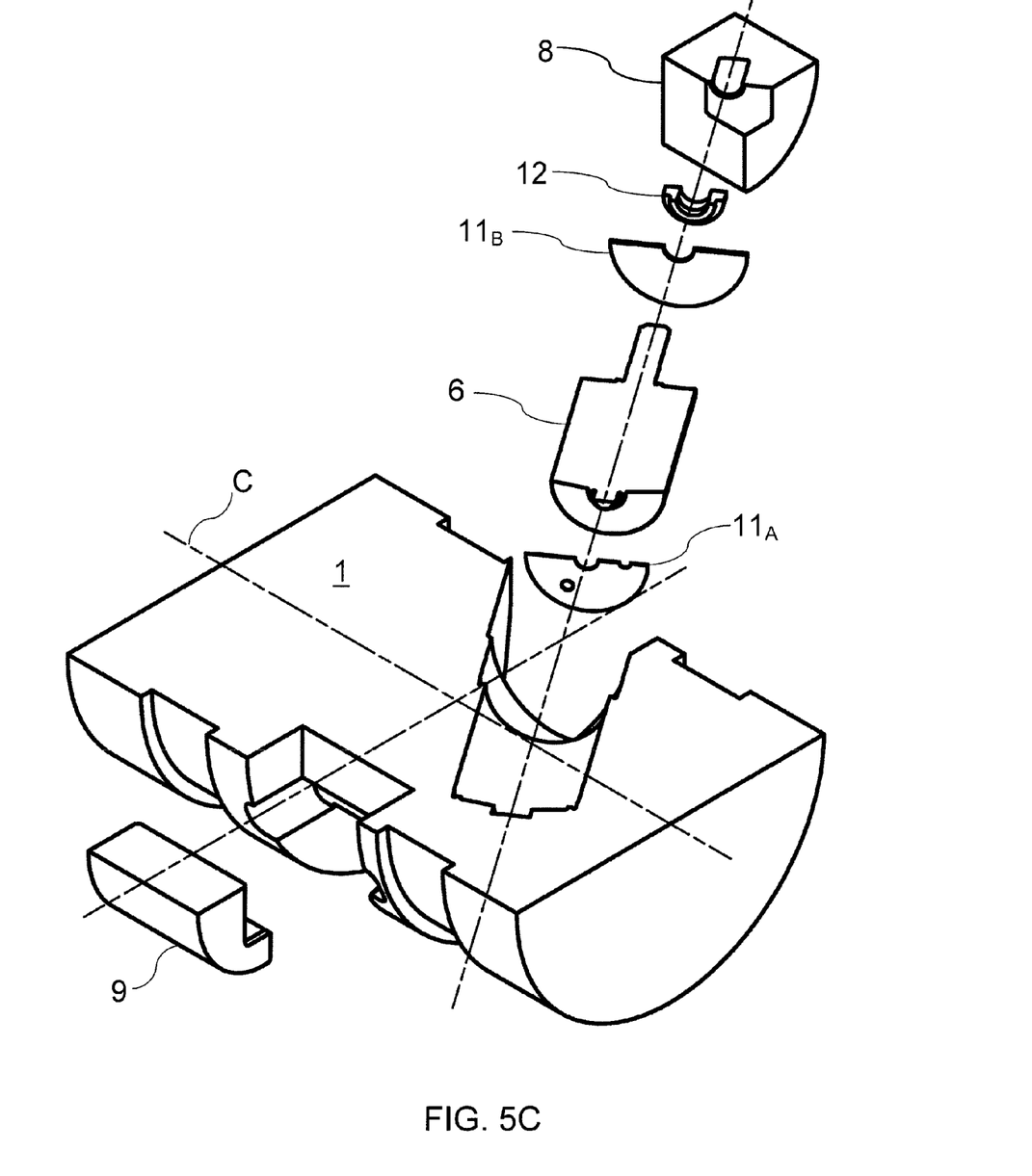
FIG. 5C shows an exploded view of a slanted accelerometer element that is a part of the tri-axis accelerometer according to different aspects of the invention s.

FIG. 4B also illustrates how the counter mass 6 at one end is coupled via a spring element $11_{A,B}$, for example a membrane element or a simple helical spring, to the support structure 1.

Figure 6:
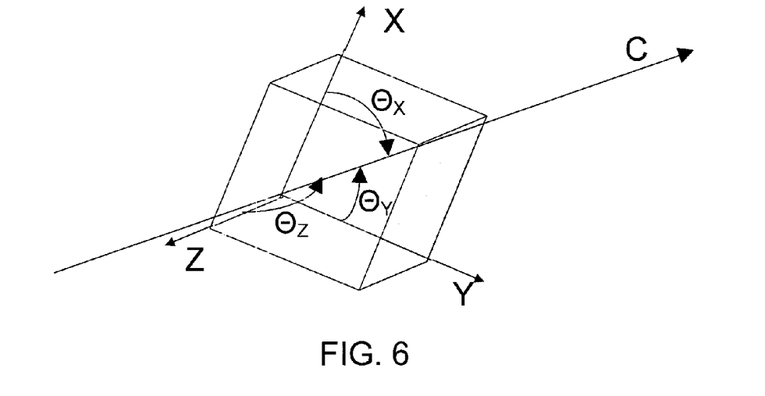
FIG. 6 is a schematic diagram illustrating how the counter masses of three slanted accelerometer elements in an example embodiment of the invention may be arranged to be movable in three different directions with respect to the common coiling axis.

FIG. 6 illustrates schematically the directions of movement of the counter masses of three accelerometer elements in a preferable embodiment of the tri-axis accelerometer according to the invention. In this embodiment all three accelerometers elements are slant angle accelerometer elements. The directions of movement of the three counter masses of three accelerometer elements may be set to define a set of axes x, y, and z, arranged as shown in FIG. 6 with angles $\theta_x$, $\theta_y$, and $\theta_z$, with respect to the coiling axis C.

In one embodiment of the tri-axis accelerometer according to the invention the set of axes x, y, and z is an orthogonal set of axes and the angles $\theta_x$, $\theta_y$, and $\theta_z$ are defined by $\theta_x=\theta_y=\theta_z=\mathrm{acos}\,\sqrt{(1/3)}$. In this embodiment all three accelerometer elements will have the same form and are only differentiated by their orientation. In a tri-axis accelerometer this means that the accelerometer elements $A_{1-3}$ may all be arranged in the same manner with respect to a common coiling axis. Having three similar accelerometer elements arranged in this manner simplifies the manufacturing of the tri-axis accelerometer as similar parts may be used to build all of the accelerometer elements. In this embodiment of the invention the three counter masses are arranged to provide for three slanted accelerometer elements along the longitudinal axis of tri-axis accelerometer. The accelerometer elements $A_{1-3}$ of tri-axis accelerometer according to the present invention are highly suitable for efficient manufacturing of long lengths of seismic cable 101.

In a manufacturing method it is important to be able to produce all the optical fibre components in a smooth operation, forming as many of the fibre components as possible from a single length of fibre. The present invention enables the coiling of several components, for example several fibre optic accelerometer elements $A_{1-3}$ in a continuous coiling process without the need for cutting and splicing the optical fibre and without any handling of the completed fibre coils after the fibre coiling. By using the fibre optic accelerometer design according to the present invention the optical fibre may be coiled directly into the correct positions on a sensor package including a tri-axis accelerometer according to the invention right away, meaning the optical fibre after the coiling operation will be correctly positioned in the sensor package (and in a seismic cable if the sensor package is incorporated in or manufactured as part of such a cable) and that no movement or manual handling of the fibre coils is strictly required following the coiling operation.

By providing all operative elements apart from the fibre coils mounted permanently in their final position in a tri-axis accelerometer or in a sensor package before winding the optical fibre coils results in that no reorganization of the elements will be required after the fibre coiling operation, in contrast with previously known solutions.

An aspect of the invention is thus a fibre optic tri-axis accelerometer which is highly suitable for application in seismic cables. The tri-axis accelerometer may however also find application in other areas where three-dimensional sensing of acceleration is desirable. The sensitivity or "gain" function of the accelerometer elements may be tailored by increasing or decreasing the number of turns of fibre in each corresponding fibre coil. The contribution of the fibre coil to the spring constant of the spring element may be adjusted as desired by altering the number of turns of the coil or by inserting a different helical spring or a different membrane element having different properties. Such changes will typically be implemented as part of an adjustment of the production steps of the accelerometer elements.

The fibre optic tri-axis accelerometer for sensing acceleration in three dimensions according to this invention comprising a first, a second and a third sensor base 6, 8, 9, each base including a first, a second and a third fixed element 9, respectively, and a first, a second and a third movable element 6, 8, respectively. The three movable elements are arranged to be movable in parallel with a first axis x, a second axis y and a third axis z, respectively. The axes x, y, and z may form an orthogonal set of axes. In the tri-axis accelerometer according to the invention the set of axes defining the directions of movement of the three movable elements 6, 8 may be slanted at angles $\phi_x$, $\phi_y$, and $\phi_z$, respectively, with respect to coiling axis C of the fibre coils 3. The slant angle may be different for each sensing coil and each associated movable element, however, production may be simplified if the slant angle is the same for all accelerometer elements $A_{1-3}$, as this means that the coils and movable elements all may have the same basic design. The directions A (x, y, and z directions of respective accelerometers) of movement of the three movable elements 6, 8 may have the same angle with respect to the coiling axis C of the fibre coils.

First, second and third fibre sensing coils 3 are arranged on respective combinations of first fixed 9 and movable 6, 8 elements, second fixed 9 and movable 6, 8 elements, and third fixed 9 and movable 6, 8 elements, respectively. The three fibre coils are all coiled about a common coiling axis C. Each combination of movable and fixed element will typically be arranged at consecutive positions along a support structure 1, for example along an elongate structure such as a seismic cable 101, in order to separate the sensing coils from each other on the support structure 1. The support structure 1 may be a part of the seismic cable 101.

The three fibre coils 3 may be coiled in a non-circular manner, for example to provide a coil of elliptic or similar elongated form. The three fibre coils 3 may be oriented at different angles in the coiling plane, for example in a symmetric fashion around the coiling axis, that is, at 120 degrees with respect to each other as seen about the coiling axis C.

The manufacturing of a tri-axis accelerometer according to the present invention may start by providing a body or support structure 1 suitable for machining or otherwise creating a support structure 1 having bores for accommodating the movable element 6, 8. The support structure 1, which may be part of a large structure such as for example a seismic cable, may also be provided with a fixed element 9 with a semi-cylinder outer surface onto which the fibre coil may be mounted. As an alternative the fixed element 9 may be produced separately and attached to the support structure 1 using suitable fastening means and techniques.

In the manufacturing method according to the invention a tri-axes fibre optic based accelerometer is formed by arranging three accelerometer elements so that the fibre sensor coils have a common coiling axis C. At least one accelerometer element is a slant angle accelerometer element, that is, it is arranged with the sensing direction at a slant angle with respect to the coiling plane. This slant angle is provided by providing a bore, for example a cylindrical bore 7, at an angle between 0 and $\pi/2$ radians with respect to the coiling axis C. The bore 7 should have sufficient depth to give a counter mass 6 sufficient space to move within the bore along its longitudinal axis A.

The accelerometer elements are spaced along the common coiling axis, possibly equally separated, and possibly with all three accelerometer elements in the same support structure 1 of the seismic cable. As an alternative the three accelerometer elements may be produced in three separate body 1 sections, either adjacently mounted or arranged in a spaced manner. Corresponding first, second and third sets of fixed elements of the first, a second and a third sensor bases, respectively and corresponding first, second and third movable elements of the first, a second and a third sensor bases, respectively, may be arranged so that the movable elements are movable in parallel with a first, a second and a third axis or directions x, y, and z, respectively.

The three axes may be defined or oriented with the same angle in relation to the coiling axis C, for example in a manner so that each each one of the three axes is orthogonal to the two other axes, thus defining an orthogonal set of axis.

The optical fibre coils of the accelerometer elements $A_{1-3}$ may be formed by deploying the optical fibre from a deployment apparatus onto the cylindrical parts 8, 9 of the accelerometer elements in a continuous coiling operation. In this way the three fibre coils may be formed in a continuous section of fibre, and so that each fibre coil is arranged on respective sensor bases. The coiling of all the three fibre coils then constitutes a single process step. Typically, the fibre deploying apparatus may be controllably moved along a circular trajectory a number of times around the common coiling axis C. The common coiling axis C may be equal to a longitudinal axis of a seismic cable.

The movable elements may be partially mounted with the counter mass 6 end into the cylindrical bore 7 of the body or support structure 1. At least one end of the counter mass 6 is coupled to the support structure 1 via a spring element, for example a membrane structure or a helical spring. The support structure 1 may be part of a seismic cable.

The optical fibre may be wound onto the accelerometer bases and possibly also onto reference bases in a single coiling operation. The reference bases do not have a movable element. The optical fibre may be provided with fibre Bragg gratings (FBGs) either in a separate process stage before being wound to form one or more fibre optic accelerometer elements in a seismic cable structure. The optical fibre may be provided with FBGs in a continuous process either during or after the winding step. The optical fibre may be attached, for example by gluing, at selected points on the accelerometer elements/reference unit in addition to on points on a support structure 1 or on a seismic cable, and the FBGs may be arranged at selected positions with reference to the gluing points. The pitch and strain of the optical fibre may thus be adapted for the individual accelerometer elements.

Figure 7A:
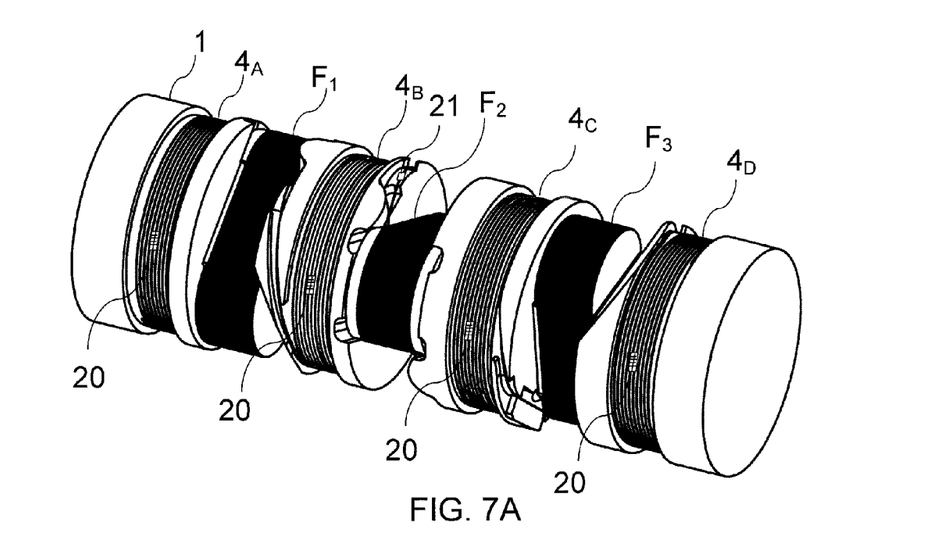
FIGS. 7A-B illustrate a completed fibre optic tri-axis accelerometer according to the present invention with the optical fibre shown.
Figure 7B:
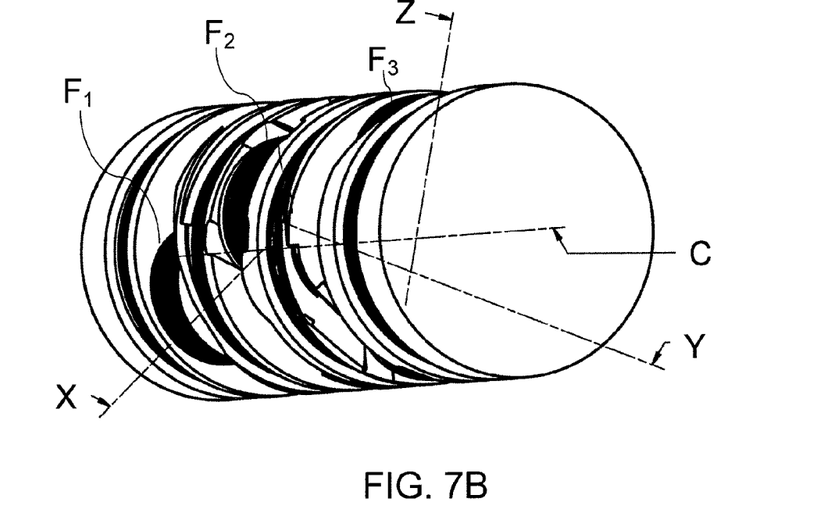
Figure 7C:
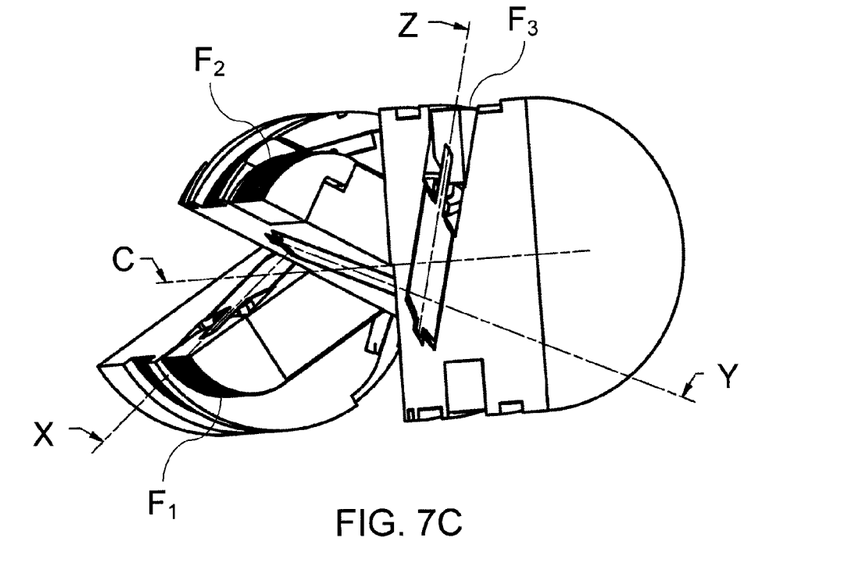
FIG. 7C illustrates the tri-axis accelerometer of FIGS. 7A-B with cut-outs along planes including the direction of movement of the movable elements, so as to illustrate the slant angle principle of the tri-axis accelerometer.

FIG. 7 provides a more detailed example of the schematic diagram of FIG. 3 and illustrates how three optical fibre accelerometer coils $F_{1-3}$ can be arranged along a common coiling axis of the support structure 1. As in FIG. 3 reference elements 20, such as for example optical fibre Bragg gratings (FBGs), are prepared in the optical fibre on each side of each fibre accelerometer coils $F_{1-3}$ so as to define the active sensor fibres for each of the accelerometer elements $A_{1-3}$. The strain of the FBG may be controlled by bonding the fibre on each side of the FBG to isolate the FBG from the strain on the fibre. In this way a stable Bragg wavelength is maintained, i.e. the strain in the FBG is controlled. The FBGs may be placed on an accelerometer element itself, on the intermediate section or even in the transition region between an accelerometer element and an intermediate section.

On FIG. 7 the FBGs 20 are arranged near the middle of the intermediate coils $4_{A-D}$, meaning that a section of the intermediate coil will be included in the active sensor fibre of each accelerometer element. By defining the ratio of the length of the part of the active senor fibre on the intermediate section to the length of the active fibre on the accelerometer coil, the sensitivity of the active sensor fibre to acceleration may be defined.

Another way of defining the sensitivity of the accelerometer element could be to change the weight of the movable element 6, 8 or the counter mass 6 or by changing the stiffness of the spring element.

As is shown on FIG. 7 all three accelerometers coils and the intermediate coils 4A-D may be prepared from a single length of optical fibre. In this case the intermediate coils $4_{A-D}$ may be mounted to have a controlled strain, so as to reduce any movement or change in strain of the optical fibre of the intermediate coils when the tri-axis accelerometer is subjected to external influences. For this controlled strain the optical fibre may be attached to a part of the support structure 1 at selected attachment points 21, for example by gluing. As shown on FIGS. 3 and 7 the attachment points 21 may be located in the transition region between an accelerometer fibre coil and the adjacent intermediate fibre coil. The intermediate fibre coils and the attachment points may be placed and prepared so as to provide some strain in the intermediate fibre coils by coiling the optical fibre with some strain during the manufacturing process.

A major benefit of the tri-axis accelerometer of the present invention is that the fibre coils of the accelerometer elements are all coiled about a common coiling axis, that is, with the plane of the coils oriented in the same direction, meaning that the coiling operation during manufacturing may be performed in one operation without requiring reorganization of the fibre coils after the coiling operation. This way a complete tri-axis accelerometer may be readily and efficiently coiled. This is particularly useful in the manufacturing of seismic streamer cables where a large number of tri-axis accelerometers are used and it is desirable to have an efficient and reliable coiling operation. It is anticipated that this increases the reliability of the production process, due to a simplified production process.

The optical fibre of a seismic cable may comprise multiple fibre Bragg gratings FBG1-FBGn wound and prepared so that for each accelerometer coil there is a corresponding pair of gratings, one on each side of the optical fibre coil of the accelerometer, and where two neighboring sensors share one grating. The gratings of one tri-axis accelerometer containing three individual accelerometer elements may for example have the same wavelength to allow time multiplexing of several tri-axis accelerometers along a seismic cable. The different tri-axis accelerometers may have different grating wavelengths of the FBGs to allow wavelength multiplexing of each tri-axis accelerometer.

The fibre Bragg gratings may be interrogated by time division multiplexing (TDM) to obtain values representing the status of the accelerometer elements or reference units, by any one or more of the interrogation techniques known to a person skilled in the art.

Other ways of arranging fibre Bragg gratings can be used. In some embodiments of the tri-axis accelerometer according to the invention an FBG network may be provided along the optical fibre so that pairs of FBGs, the two FBGs of a pair being arranged with one FBG on either side of an accelerometer fibre coil, and with the two FBGs of a pair having the same wavelength, while a next pair of FBGs, with one FBG on each side of another accelerometer element of the tri-axis accelerometer, has a different wavelength. This will provide a purely wavelength multiplexed network (no time division multiplexing), limiting the number accelerometer elements (sensors/channels) along a single fibre. In return the fibre between the accelerometer elements will not be active.

The tri-axis accelerometer according to the present invention may be combined with a hydrophone to form a four component (4C) sensor station, where the optical fibre of the tri-axis accelerometer as well as the hydrophone is coiled in one operation. The combination of tri-axis accelerometer and hydrophone may be arranged as a sensor station along a seismic cable. A seismic cable may contain a multiple of sensor stations so that the seismic cable may stretch over some distance, for example for use in seismic cables in permanent seafloor systems for the monitoring of subterranean hydrocarbon reservoirs. Alternatively a reference coil may also be included in the sensor station, coiled in the same coiling operation.

Although the present invention has been described in connection with the described embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. A tri-axis accelerometer for use in seismic surveying, the accelerometer comprising:
    at least three fibre optic accelerometer elements, wherein the accelerometer elements comprise respective fibre sensor coils, wherein the fibre sensor coils are coiled about a common coiling axis and at least one of the accelerometer elements is a slant angle accelerometer element.

2. The tri-axis accelerometer according to claim 1, wherein a counter mass of the slant angle accelerometer element is movable in a direction at an angle $\theta$ defined by $0<\theta<\pi/2$ with respect to the common coiling axis.

3. The tri-axis accelerometer according to claim 1, further comprising:
    a first, a second, and a third sensor base, wherein the bases comprise corresponding first, second, and third fixed elements, respectively, and corresponding first, second, and third movable elements, respectively.

4. The tri-axis accelerometer according to claim 3, wherein the three movable elements are arranged to be movable in parallel with corresponding first, second, and third axes, respectively.

5. The tri-axis accelerometer according to claim 4, wherein the three axes form an orthogonal set of axes.

6. The tri-axis accelerometer according to claim 5, wherein the orthogonal set of axes are oriented so that they have a same angle $\theta$ with respect to the common coiling axis.

7. The tri-axis accelerometer according to claim 6, wherein the same angle θ is defined by θ=acos√(⅓).

8. The tri-axis accelerometer according to claim 5, wherein the three axes forming the orthogonal set of axes are symmetrically arranged with respect to the common coiling axis.

9. The tri-axis accelerometer according to claim 1, further comprising:
   optical fibre Bragg gratings (FBGs) in the fibre sensor coils of the accelerometer elements.

10. A method of manufacturing a tri-axis fibre optic accelerometer, the method comprising:
    arranging three accelerometer elements comprising respective fibre sensor coils, wherein the fibre sensor coils are all coiled around a common coiling axis, and characterized in that at least one of the accelerometer elements has a movable element arranged to be movable at a slant angle with respect to a plane of the respective fibre sensor coil.

11. The method according to claim 10, further comprising:
    arranging corresponding first, second, and third sets of fixed elements of first, second, and third sensor bases, respectively and corresponding first, second, and third movable elements of the first, second, and third sensor bases, respectively, so that the movable elements are movable in parallel with first, second, and third axes, respectively.

12. The method according to claim 11, wherein the three axes are oriented at a same angle θ with respect to the common coiling axis in a manner so that each one of the three axes is orthogonal to the two other axes.

13. The method according to claim 11, further comprising:
    coiling an optical fibre onto respective fibre carrying surfaces of the three sensor bases in a continuous operation thereby forming the three fibre sensor coils in a continuous section of the optical fibre, wherein each of the fibre sensor coils are arranged on respective sensor bases.

14. The method according to claim 13, wherein prior to coiling the optical fibre, the accelerometer elements are placed in their final position in the tri-axis accelerometer, so that no reorganization of the accelerometer elements is required after coiling the optical fibre.

15. The method according to claim 10, further comprising:
    coiling a fibre coil of a fibre optic hydrophone around the common coiling axis.

16. A fibre optic tri-axis accelerometer for sensing acceleration in three directions, comprising:
    a first, a second, and a third sensor base, wherein each base comprises a first, a second, and a third fixed element, respectively, and a first, a second, and a third movable element, respectively, wherein each pair of the fixed and movable elements comprise a fibre sensing coil, wherein the fibre sensing coils are all coiled around a common coiling axis, wherein at least one of the movable elements is designed and mounted so as to be movable in a direction that is slanted with respect to the common coiling axis.

17. The tri-axis accelerometer according to claim 16, wherein the first, the second, and the third movable elements are movable in a first, a second, and a third direction, respectively, wherein the first, second, and third directions span a three-dimensional space.

18. The tri-axis accelerometer according to claim 16, wherein the three movable elements comprise three respective movable masses arranged to be movable in parallel with a first, a second, and a third axis, respectively, wherein the three axes form an orthogonal set of axes, wherein the set of axes define directions of movement of the three movable masses.

* * * * *